Patented Aug. 16, 1938

2,127,248

UNITED STATES PATENT OFFICE 2,127,248

PROCESS FOR PREPARING RESINOUS MATERIAL AND PRODUCT

George L. Dorough, Wilmington, Del., assignor, by mesne assignments, to E. I. du Pont de Nemours & Company, Wilmington, Del., a corporation of Delaware No Drawing. Application February 13, 1936, Serial No. 63,738

7 Claims. (Cl. 260—2)

The present invention relates to novel resinous materials which consist of esters of polymerized lactic acid in which one or more of the reactive hydroxy or carboxylic groups have been esterified. These novel resins are intended for use in plastic materials and coating compositions based on cellulose derivatives, as well as for other industrial purposes. My invention also embraces the process of making these novel resins and in its broadest embodiment comprises heating polymerized lactic acid with an organic compound which is able to react with a hydroxy or a carboxy group to form an ester, i. e., with an organic esterifying agent.

Simple lactic acid resins are more or less hard and brittle. They also have a high acid value and are more or less readily susceptible to hydrolysis. The novel resinous materials of this invention are more or less plastic and form flexible films and the products are much less susceptible to hydrolysis. It is also possible by this invention to adjust the acid number of the novel resins from a substantially neutral product to a product having a high acid value.

It is believed that lactic acid resins consist largely of linear polymers having a free carboxylic group on one end and a free hydroxyl group on the other end of the molecule. When I heat such a resin with a substance which contains a reactive hydroxyl or carboxyl group or both (i. e. with at least one organic esterifying agent), it is assumed that these groups react with the hydroxyl and/or carboxyl groups of the resin to form esters, or ethers, since water is eliminated and new resins of different properties are produced.

The esterifying agents which I react with the lactic acid resins are hydroxy compounds and carboxylic acids and hydroxy esters, preferably of more than 3 carbon atoms. I may also use a plurality of such agents, for instance, an alcohol and an acid. If both such compounds are used in a single resin, it is sometimes desirable to add them in separate stages so that they preferably react with the polymerized lactic acid in the desired manner rather than with each other.

Practically all simple hydroxy compounds are suitable for modifying lactic acid resins. Somewhat preferred are hydroxy compounds of a high boiling point above, for instance, 100° C. These hydroxy compounds may be alcohols or phenols among which I wish to mention the following as having been used or which could be used in preparing my novel resins: butylalcohol, octanol, n-dodecyl alcohol; ethylene glycol, glycerol, sorbitol; cyclohexanol, methyl cyclohexanol, benzylalcohol; oleyl- and eleostearyl alcohols; hydroxy esters, such as castor oil and hydrogenated castor oil (hydroxy stearin) phenol, and the napthols.

The acids suitable for use in the present invention are mono-carboxylic acids such as butyric acid, stearic acid, linseed oil acids, China-wood oil acids, abietic acid, benzoic acid, naphthoic acid, and especially hydroxy mono-carboxylic acids such as castor oil acids, hydroxy stearic acid (from hydrogenated castor oil) and hydroxybenzoic acid. The hydroxy acids are of special benefit in that they react with both the acid and alcohol groups which may be present in the lactic acid polymer. Of the hydroxy acids, those having the hydroxyl and carboxyl groups attached to different carbon atoms are preferred since they exert a favorable effect on the flexibility of the final resin.

Esterifying the lactic acid resins with a carboxylic acid and a hydroxy compound produces usually substantially neutral resins, or resins of a low acid number. Esterifying the polymerized lactic acid with both glycerol and a fatty acid has, for instance, produced neutral resins of excellent properties.

In preparing my novel esterified resins, according to this invention, I, first, as is well known for instance from my U. S. Patent 1,995,970, polymerize lactic acid by heating it to, for instance, 265° C. and subsequent removal of by-products by vacuum.

It appears necessary that a substantial polymerization of the lactic acid be effected before the esterifying agent is added to the reaction mixture as, if the agent is added too soon after the last of the water has been driven off, a mixture is obtained which contains compounds which are not compatible with the cellulose derivatives with which the new resins are intended to be used and cloudy or opaque compositions would be produced when the resins are incorporated into cellulose compositions.

The desired esterifying agent is added to the heated polymerized lactic acid and heating continued whereby water is split off and distilled out, with vacuum being applied if necessary. The esterification step is preferably carried out at or above 200° C., but the temperature depends to a certain extent upon the type of agent used. If the agent is volatile at the reaction temperature I prefer to operate under reflux. It is in many instances advisable to introduce the esterifying agent dissolved in or mixed with an inert solvent, for instance, naphtha having a boiling range of 100 to 200° C. A solvent of this type has various beneficial effects in facilitating the reaction between the lactic acid resin and the esterifying agent, it particularly assists in the distillation off of the water formed in the reaction. After completion of the reaction, which is evidenced when no more water is formed, the heating of the reaction mass is continued for a short time, preferably under vacuum, whereby the last traces of solvent and any possible by-products or uncompletely reacted lactic acid derivatives are eliminated.

If it is not required that the final product have a low acid value, no definite proportion of esterifying agent is required. The properties of the resulting resin will then depend partly on the proportions and partly on the nature of the esterifying agent or agents used. In general, the effect of increasing the proportion of esterifying agent or agents is to modify the hard, brittle character of the lactic acid polymer by rendering it more flexible. If, however, it is desired to prepare a substantially neutral resin, the lactic acid is polymerized to its desired degree and the average molecular weight determined or inferred from experience. Somewhat more of the esterifying agent is then used. More than the calculated amount will react since the reaction by which the polymeric lactid chains are formed is reversible.

The resins of my invention are clear products varying in consistency from a syrupy liquid through balsam-like nature to a tough plastic nature. Resins of various acid values have been produced, for instance, as follows: using hydroxy glycerides, 22–30; using hydroxy acids, 53–55; using both hydroxy acid and polyalcohols 17; using fatty acids and glycerol, 15; using higher molecular alcohols, 7.

The average molecular weights of the novel esterified lactic acid resins vary from about 950 to 1000 to 1500 to 2500, with the lower molecular weight obtained, for instance, from lauryl alcohol.

The following examples will further illustrate my invention:

Example I

Five-hundred parts of 50% lactic acid was polymerized to an average molecular weight of about 1,000, as for instance described in my Patent 1,995,970. Thirty parts of hydroxystearin (hydrogenated castor oil) was then added and heating continued for 2 hours at 225° C., hi-flash naphtha being introduced drop-wise during this time. In order to remove the water formed during the reaction, the naphtha was allowed to distill off through a goose-neck tube connected to a condenser, the rates of introduction and distillation of the naphtha being approximately the same. The product was then heated under reduced pressure at 225° C. until all the solvent naphtha was expelled and crystalline lactid started to distill from the vessel. The final pressure was about 2 millimeters.

The product obtained was a tough rubbery resin having an acid number of 22 and an average molecular weight of 2460. It was soluble in aromatic hydrocarbons and can be used in various plastic compositions, forming on evaporation of the solvent, a pliable film.

Example II

Thirty parts of n-dodecyl alcohol was added to polymerized lactic acid produced from 500 parts of 50% lactic acid as described in Example I. The alcohol was added by dissolving it in 100 parts of hi-flash naphtha and dropping the solution in over a period of 45 minutes, the naphtha being allowed to distill off as in Example I. The mixture was then reacted for 2 hours at about 225° C., and finally heated under reduced pressure at 200° C.

The product was a syrupy liquid having an acid number of 7 and an average molecular weight of 940. Its use in plastic compositions will be described further on.

Example III

To the polymerized lactic acid prepared from 500 parts of 50% acid as described in Example I was added 50 parts of China-wood oil acids dissolved in 100 cc. hi-flash naphtha. The addition required one hour and the mixture was then heated for another hour at 255° C.–265° C. Ten parts of glycerol was then added and heating continued an hour at 225° C.–230° C., solvent being dropped into the flask continuously and allowed to distill off through a condenser to remove the water of reaction.

The product was a resin of balsam-like consistency. It has an acid number of 15 and an average molecular weight of 1840.

Example IV

Five-hundred parts of 50% lactic acid was concentrated by distilling off the water as previously described. The acid was polymerized by heating with stirring for one hour at 250° C. and for another hour at 265° C. No solvent was used in this case. Twenty-five parts of phenol was then added and heating continued for two hours at 225° C. The temperature was then dropped to 200° C. and the product heated under vacuo for about 30 minutes, at which time distillation had ceased. The final product was a tough, plastic resin having no odor of free phenol. It had an acid number of 117 and was soluble in alcohol.

Other esters which have been prepared are as follows:

The lactic acid polymer prepared from 500 parts of 50% acid was reacted with 30 parts of castor oil acids. The product was a soft resinous material having an acid number of 55 and an average molecular weight of 1350.

The lactic acid polymer prepared from 500 parts of 50% lactic acid was reacted with 30 parts of stearic acid and 10 parts of glycerol in successive stages. The product was a tough, rubbery resin having an acid number of 15 and an average molecular weight of 1640.

The lactic acid polymer prepared from 500 parts of 50% lactic acid was reacted with 50 parts of castor oil. The product was a soft resinous material having an acid number of 30 and an average molecular weight of 1680.

These products are radically different from the corresponding esters of unpolymerized lactic acid as shown by the fact that their molecular weights are several times as great.

They also differ from the polymerized lactic acid in that with a very pronounced resinous character they have a much smaller molecular weight.

While the preferred procedure includes the use of a solvent, I am not limited to this method (see Example IV above). In general, more time is required and the yields are lower if straight fusion methods are used. If the esterifying agent is quite volatile (as, for example, the lower aliphatic alcohols), the polymerization of the lactic acid is effected in the usual manner, either using a solvent or not as desired, and a re-flux condenser is then attached for the esterification state to prevent loss of the volatile material, no solvent being used in this stage. After the desired esterification has taken place, the product may be heated under reduced pressure for a short time. I prefer to use a temperature of 265° C. for the polymerization of the lactic acid. While I consider this to be an optimum temperature, it is by no means critical, and other temperatures may be used. The effect of using a temperature lower than 265° C. is to increase the time required, while the effect of using a higher temperature is to cause some decomposition of the acid. The temperature used during the esterification stage depends largely on the nature of the esterifying agent.

The esters of polymerized lactic acid may be used as the resinous components of coating compositions. They are compatible with nitrocellulose, and in certain ratios, with cellulose acetate and ethyl cellulose. When combined with nitrocellulose in lacquers, they give coatings which have very good durability characteristics.

Example A

| | Parts by weight |
|---|---|
| Castor oil acids ester of polymerized lactic acid | 10 |
| Nitrocellulose | 10 |
| Castor oil | 2 |
| Dibutyl phthalate | 2 |
| Solvents (to spraying viscosity) | 125.3 |

Example B

| | Parts by weight |
|---|---|
| n-Dodecyl alcohol ester of polymerized lactic acid | 10 |
| Nitrocellulose | 5 |
| Solvents (to spraying viscosity) | 76 |

A suitable mixture of solvents for the above lacquers is as follows:

| | Per cent |
|---|---|
| Esters | 40 |
| Alcohols | 10 |
| Aromatic hydrocarbons | 50 |
| | 100 |

Examples C and D

| | Parts by weight | |
|---|---|---|
| Castor oil ester of polymerized lactic acid | 10 | 5 |
| Ethyl cellulose | 10 | 10 |
| Dibutyl phthalate | 2 | 2 |

Used in solution containing 20% solids, in following solvent mixture:

| | Per cent |
|---|---|
| Ethyl alcohol | 25 |
| Toluene | 25 |
| Xylene | 25 |
| Butyl alcohol | 25 |
| | 100 |

Example E

| | Parts by weight |
|---|---|
| n-Dodecyl ester of polymerized lactic acid | 10 |
| Cellulose acetate | 40 |

Above was formulated as a 10% solution in methyl cellosolve.

Pigments may be incorporated into any of the above coating compositions if desired.

The compositions prepared in Examples A to E were used in lacquers, or other coating compositions, and durable, flexible films obtained therefrom.

The products prepared by this invention have also a variety of other uses such as insulating varnishes, molding plastics, impregnating compounds for cloth, felt and the like and as sizes for paper.

I claim:

1. A process for preparing resinous material which consists in reacting at a temperature of at least 225° C. polymerized lactic acid and at least one esterifying agent selected from the group consisting of monocarboxylic acids, phenols and alcohols, continuing the reaction until a substantial amount of water is formed, and removing the water of formation.

2. The process of claim 1 in which the polymerized lactic acid is reacted with an alcohol having a boiling point above 100° C.

3. The process of claim 1 in which the polymerized lactic acid is reacted with n-dodecyl alcohol.

4. The process of claim 1 in which the polymerized lactic acid is reacted with hydroxystearin.

5. The process of claim 1 in which the polymerized lactic acid is reacted with a fatty acid derived from a fatty oil.

6. The process of claim 1 in which the polymerized lactic acid is reacted with China-wood oil acids and thereafter with glycerol.

7. A composition of matter obtained by reacting polymerized lactic acid with at least one esterifying agent selected from the group consisting of monocarboxylic acids, phenols, and alcohols according to the process of claim 1 characterized by a different molecular weight, by being more plastic, and by being less susceptible to hydrolysis than the polymerized lactic acid.

GEORGE L. DOROUGH.